US011890735B2

(12) United States Patent
Huang

(10) Patent No.: US 11,890,735 B2
(45) Date of Patent: Feb. 6, 2024

(54) SLIDE HAMMER HAVING A REMOVABLE ACTUATION ELEMENT

(71) Applicant: Chun Po Huang, Changhua (TW)

(72) Inventor: Chun Po Huang, Changhua (TW)

(73) Assignee: TAIWAN SPECIALTY TOOL COMPANY, Changhua (TW)

( * ) Notice: Subject to any disclaimer, the term of this patent is extended or adjusted under 35 U.S.C. 154(b) by 584 days.

(21) Appl. No.: 17/117,285

(22) Filed: Dec. 10, 2020

(65) Prior Publication Data

US 2022/0184789 A1 Jun. 16, 2022

(51) Int. Cl.
*B25D 1/16* (2006.01)

(52) U.S. Cl.
CPC .................................... *B25D 1/16* (2013.01)

(58) Field of Classification Search
CPC ........................................................ B25D 1/16
USPC ........................................................ 173/90
See application file for complete search history.

(56) References Cited

U.S. PATENT DOCUMENTS 1,969,798 A * 8/1934 Hultquist ............... B25D 17/08 279/19.5
1,975,244 A * 10/1934 Wiseman .................. F16B 7/22 403/339
2,289,583 A * 7/1942 Malone ................... B23B 31/10 403/317
3,688,964 A * 9/1972 De Caro ................. B25C 1/087 227/10
4,645,373 A * 2/1987 Purdy ..................... F16B 21/00 403/381
4,679,961 A * 7/1987 Stewart ..................... F16B 7/22 24/654
4,830,252 A * 5/1989 Gottlieb .................. B25C 1/146 227/8
RE33,438 E * 11/1990 Stewart .................. B64G 99/00 24/654
5,007,762 A * 4/1991 Duran ..................... F16D 1/112 403/171
5,365,648 A * 11/1994 Fuga ........................ B25D 1/02 29/254
6,126,359 A * 10/2000 Dittrich .................... B25G 3/16 403/325
6,244,406 B1 * 6/2001 Kolbe .................. B41F 13/008 192/69.82
6,769,182 B1 * 8/2004 McCabe .................. B25D 3/00 81/463

(Continued)

*Primary Examiner* — Thomas M Wittenschlaeger
*Assistant Examiner* — Katie L Gerth
(74) *Attorney, Agent, or Firm* — Best & Flanagan LLP

(57) ABSTRACT

A removal apparatus of a threaded post contains: a drive rod, a connection element, an actuation element, and a slidable sleeve. The connection element includes a locking groove and a notch. The actuation element includes a fitting fringe corresponding to the connection element, a cylindrical neck having a diameter less than a diameter of the fitting fringe, and an engagement disc having a diameter more than the diameter of the cylindrical neck. The diameter of fitting fringe is equal to a diameter of the connection element. The slidable sleeve includes a coupling space having a diameter equal to the diameter of the fitting fringe and the diameter of the connection element. The slidable sleeve is slid so that the coupling space abuts against the fitting fringe and the connection element, and the engagement disc is engaged in the locking groove.

4 Claims, 9 Drawing Sheets

(56) References Cited

U.S. PATENT DOCUMENTS

| | | | | |
|---|---|---|---|---|
| 6,935,436 | B1 * | 8/2005 | Williston | B25D 1/16 173/132 |
| 7,168,201 | B2 * | 1/2007 | Markley | A01K 87/02 43/18.1 R |
| 7,306,396 | B1 * | 12/2007 | Chen | B25B 23/0035 81/177.85 |
| 7,316,425 | B2 * | 1/2008 | Poder | F16L 37/0841 285/305 |
| 8,308,167 | B2 * | 11/2012 | Balsells | H01R 13/2421 403/372 |
| 8,671,799 | B2 * | 3/2014 | Chen | G05G 5/065 403/321 |
| 8,764,025 | B1 * | 7/2014 | Gao | B25B 23/0042 279/22 |
| 11,389,942 | B1 * | 7/2022 | Stoltz | B25G 1/005 |
| 11,453,107 | B2 * | 9/2022 | Lin | B25C 1/085 |
| 2003/0184030 | A1 * | 10/2003 | Carbonneau | B25G 3/16 279/89 |
| 2006/0213014 | A1 * | 9/2006 | Manske | B25B 15/02 7/165 |
| 2017/0225312 | A1 * | 8/2017 | Liao | B25D 1/16 |
| 2018/0015597 | A1 * | 1/2018 | Gauthier | B25B 23/0042 |
| 2021/0039239 | A1 * | 2/2021 | Barnett, Jr. | B25B 27/02 |

* cited by examiner

SLIDE HAMMER HAVING A REMOVABLE ACTUATION ELEMENT

FIELD OF THE INVENTION

The present invention relates to a slide hammer having a removable actuation element which is capable of connecting the actuation element and the drive rod quickly.

BACKGROUND OF THE INVENTION

A conventional drive rod of a handle tool (such as a slidable hammer) contains a quick screw device and an actuation element, wherein the quick screw device is screwed with a guiding stem, and the guiding stem has a rotary lever. The quick screw device includes a resilient element and an engagement portion which are accommodated therein, a grip portion fixed on a bottom of the quick screw device, and a press portion. The actuation element is mounted on a front end of the guiding stem and includes a recessed portion, a projected portion, and an acting segment formed on a front end of the actuation element.

However, the drive segment is replaced complicatedly and troublesomely.

The present invention has arisen to mitigate and/or obviate the afore-described disadvantages.

SUMMARY OF THE INVENTION

One aspect of the present invention is to provide a slide hammer having a removable actuation element which contains the actuation element movably engaged with the connection element so that the coupling space of the slidable sleeve abuts against the fitting fringe of the actuation element and the outer wall of the connection element to limit the engagement segment of the actuation element and the locking groove of the connection element, thus connecting the actuation element and the drive rod quickly.

To obtain the above aspect, a slide hammer having a removable actuation element provided by the present invention contains: a drive rod, a connection element, an actuation element, and a slidable sleeve.

The connection element is formed in a column shape and is mounted on an end of the drive rod, the connection element includes a locking groove defined on a first end of the connection element, and a notch defined in the locking groove. A diameter of an arcuate bottom of the notch is less than a diameter of a top opening of the notch.

The actuation element includes a fitting fringe formed on a first end of the actuation element and corresponding to the connection element, a cylindrical neck extending from the fitting fringe and having a diameter less than a diameter of the fitting fringe, and an engagement disc formed on the cylindrical neck and having a diameter more than the diameter of the cylindrical neck. The diameter of fitting fringe is equal to a diameter of the connection element.

The slidable sleeve includes a coupling space formed in an arc shape and having a diameter equal to the diameter of the fitting fringe of the actuation element and the diameter of the connection element. The slidable sleeve is slid so that the coupling space abuts against the fitting fringe of the actuation element and the connection element, and the engagement disc of the actuation element is engaged in the locking groove of the connection element.

DETAILED DESCRIPTION OF THE PREFERRED EMBODIMENTS

Figure 1:
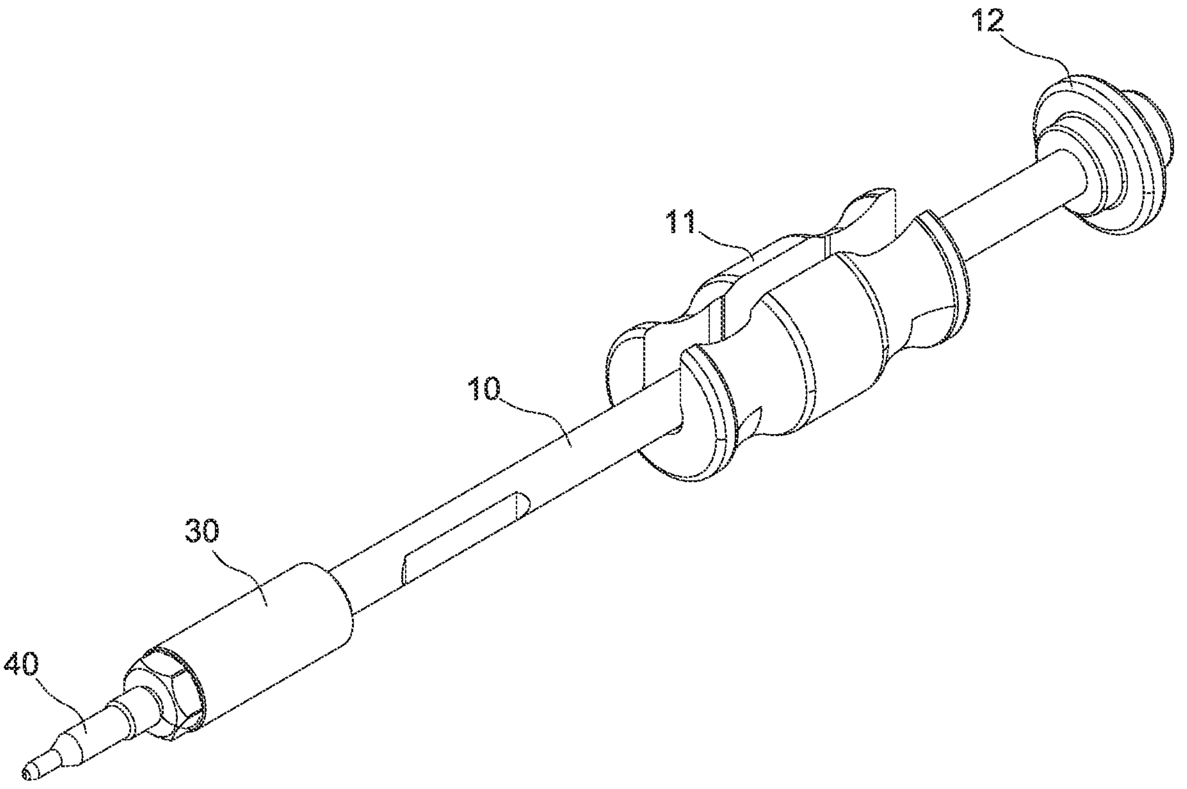
FIG. 1 is a perspective view showing the assembly of a slide hammer having a removable actuation element according to a first embodiment of the present invention.
Figure 2:
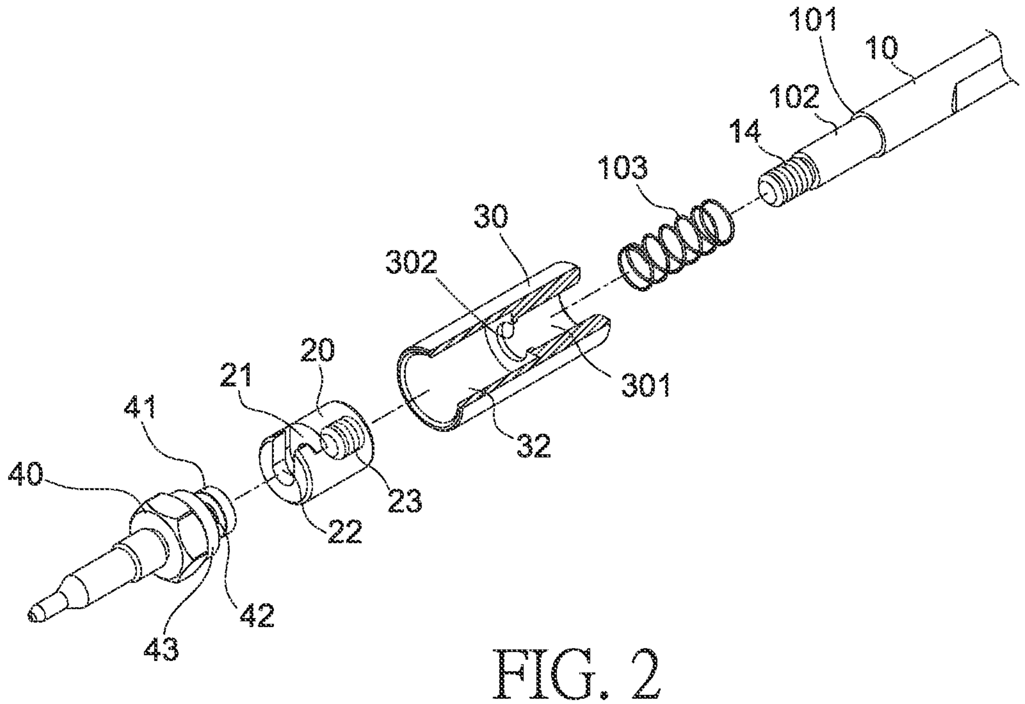
FIG. 2 is a cross-sectional perspective view showing the exploded components of the slide hammer having the removable actuation element according to the first embodiment of the present invention.

With reference to FIGS. 1 to 5, a slide hammer having a removable actuation element according to a first embodiment of the present invention comprises.

a drive rod 10 including a grip portion 11 and an acting segment 12 which both extend on a first end of the drive rod 10, a stepped shoulder 101 formed on a second end of the drive rod 10, a guide section 102 extending from the stepped shoulder 101, a first threaded section 14 extending from an end of the guide section 102 away from the stepped shoulder 101, and a resilient element 103 fitted on the guide section 102 and stopped by the stepped shoulder 101;

a connection element 20 formed in a column shape and mounted on the second end of the drive rod 10, and the connection element 20 including a locking groove 21 defined on a first end of the connection element 20, a notch 22 defined in the locking groove 21 and having an arcuate bottom, and a first threaded orifice 23 formed on a second end of the connection element 20 and screwing with the first threaded section 14 of the drive rod 10, wherein a diameter of the arcuate bottom of the notch 22 is less than a diameter of a top opening of the notch 22;

an actuation element 40 including a fitting fringe 43 formed on a first end of the actuation element 40 and corresponding to the connection element 20, a cylindrical neck 42 extending from the fitting fringe 43 and having a diameter less than a diameter of the fitting fringe 43, and an engagement disc 41 formed on the cylindrical neck 42 and having a diameter more than the diameter of the cylindrical neck 42, wherein a diameter of fitting fringe 43 is equal to a diameter of the connection element 20, such that the engagement disc 41 is engaged into the locking groove 21 of the connection element 20, and the cylindrical neck 42 is limited in the locking groove 22; wherein the actuation element 40 is connected with the grip portion 11 and the acting segment 12 of the drive rod 10 to form a slidable hammer;

a slidable sleeve 30 including a coupling space 32 formed in an arc shape and having a diameter equal to the diameter of the fitting fringe 43 of the actuation element 40 and the diameter of the connection element 20, wherein the slidable sleeve 30 is slid so that the coupling space 32 abuts against the fitting fringe 43 of the actuation element 40 and the connection element 20, and the engagement disc 41 of the actuation element 40 is engaged in the locking groove 21 of the connection element 20, wherein the slidable sleeve 30 further includes an accommodation space 301 defined opposite to the coupling space 32 and corresponding to the drive rod 10, and a defining shoulder 302 formed between the accommodation space 301 and the coupling space 32, wherein the accommodation space 301 is configured to receive the resilient element 103, and the resilient element 103 abuts against the defining shoulder 302.

Figure 3:
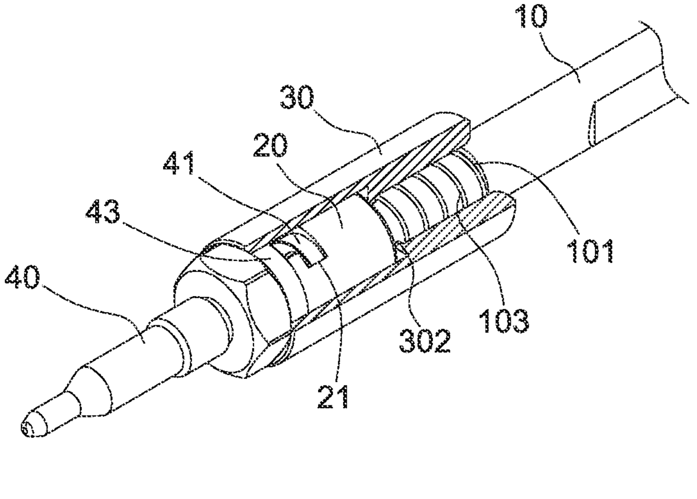
FIG. 3 is a cross-sectional perspective view showing the operation of the slide hammer having the removable actuation element according to the first embodiment of the present invention.
Figure 4:
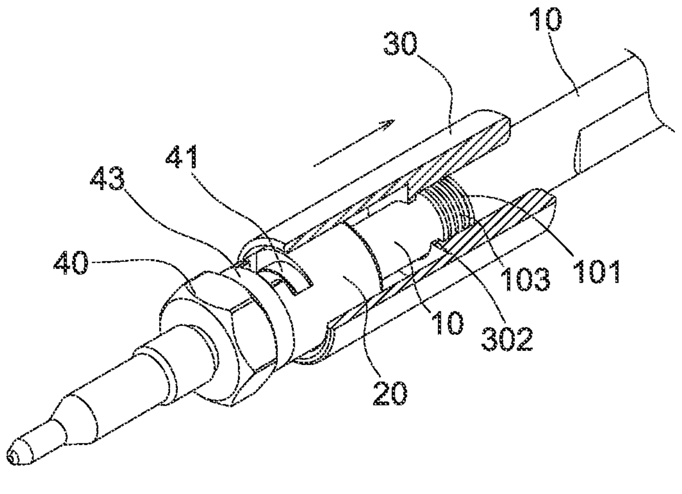
FIG. 4 is another cross-sectional perspective view showing the operation of the slide hammer having the removable actuation element according to the first embodiment of the present invention.
Figure 5:
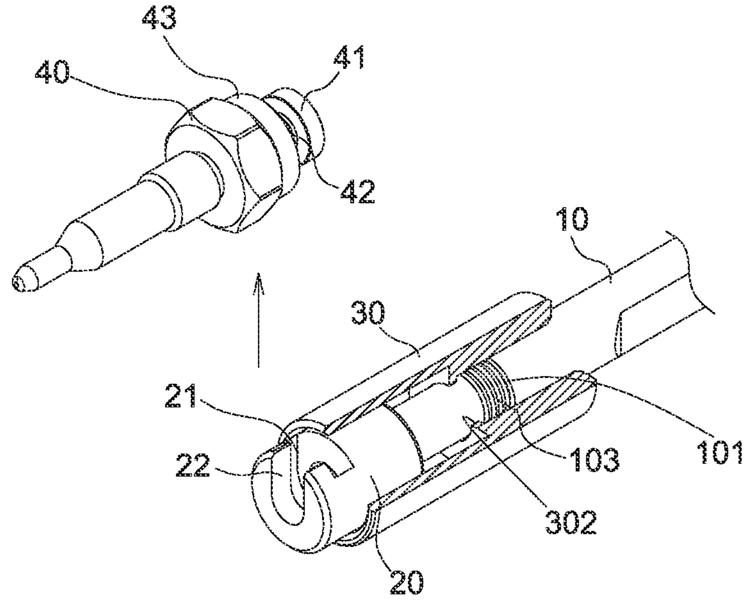
FIG. 5 is also another cross-sectional perspective view showing the operation of the slide hammer having the removable actuation element according to the first embodiment of the present invention.
Figure 6:
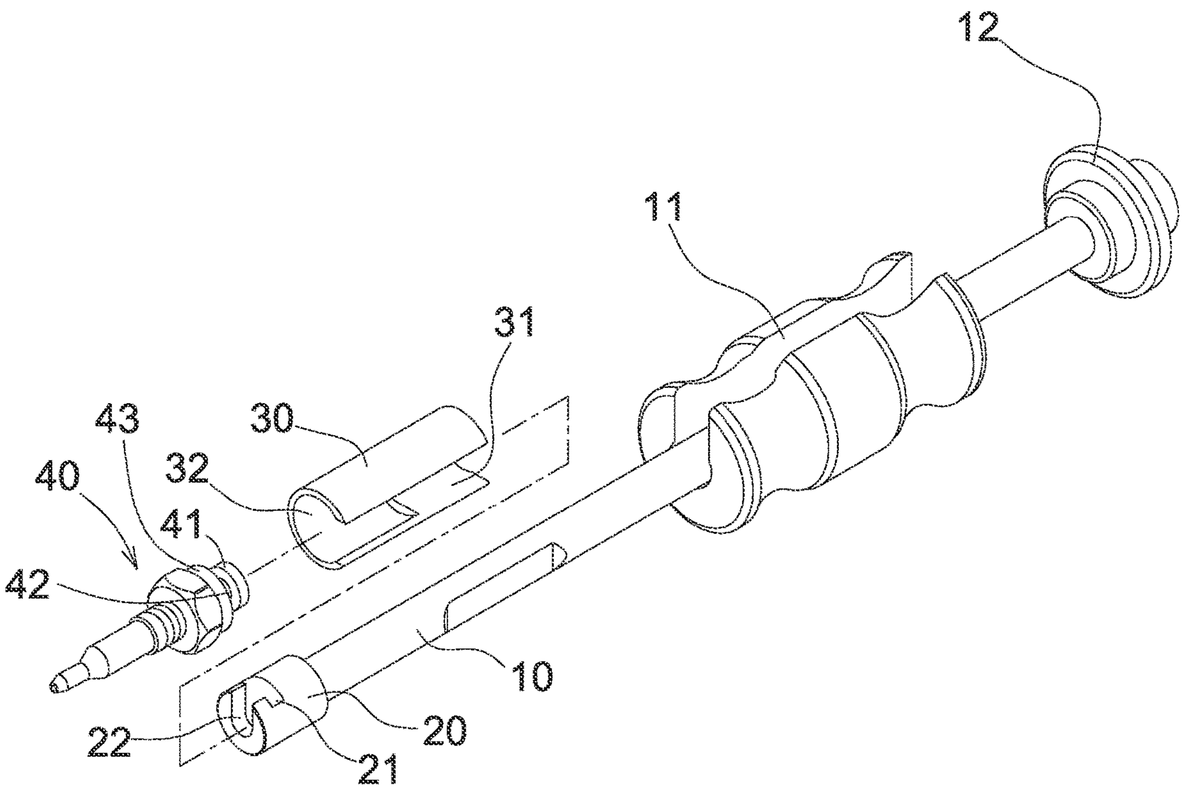
FIG. 6 is a perspective view showing the exploded components of a slide hammer having a removable actuation element according to a second embodiment of the present invention.
Figure 7:
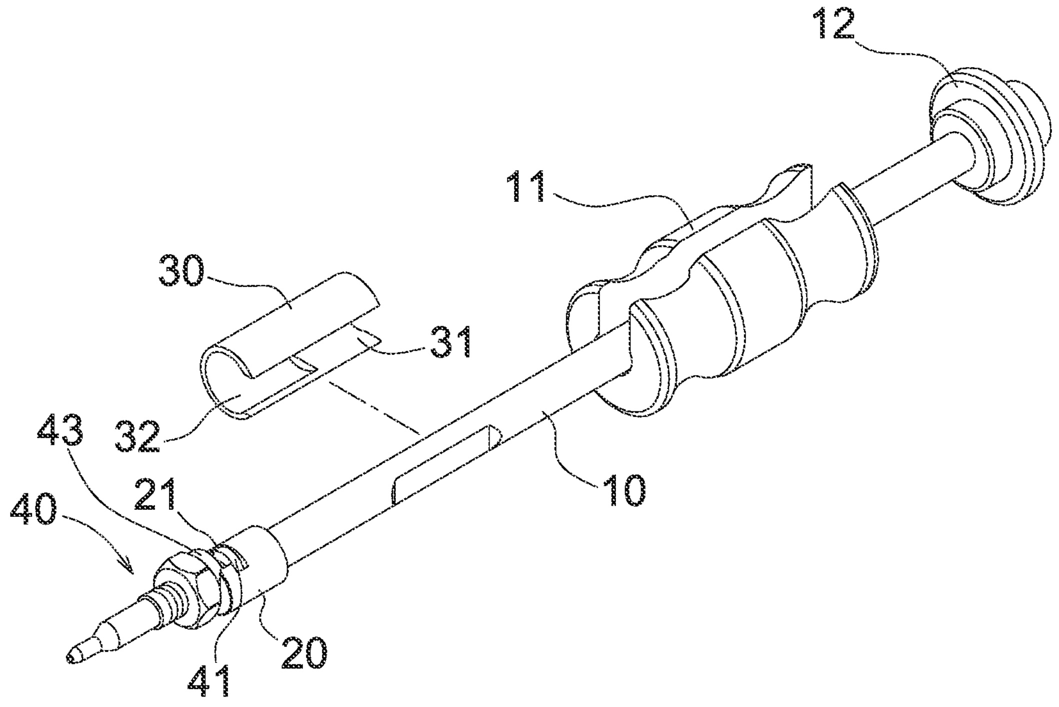
FIG. 7 is a perspective view showing the operation of the slide hammer having the removable actuation element according to the second embodiment of the present invention.
Figure 8:
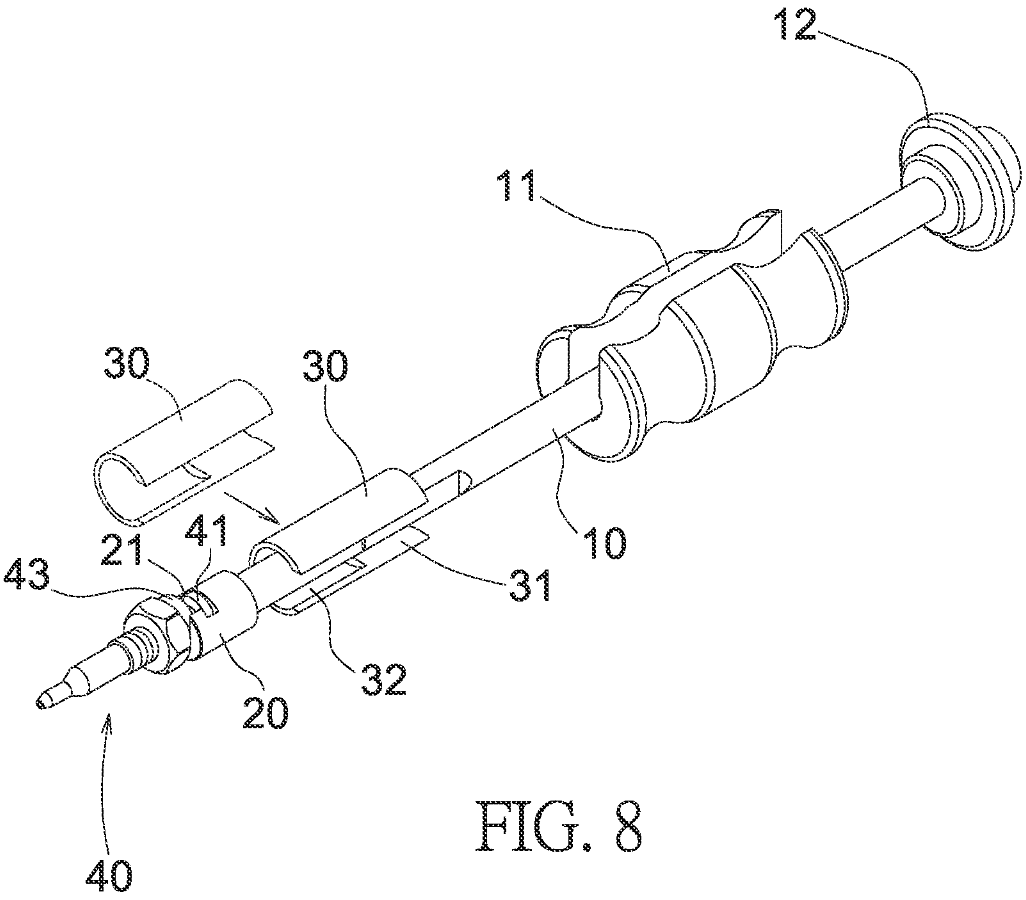
FIG. 8 is another perspective view showing the operation of the slide hammer having the removable actuation element according to the second embodiment of the present invention.
Figure 9:
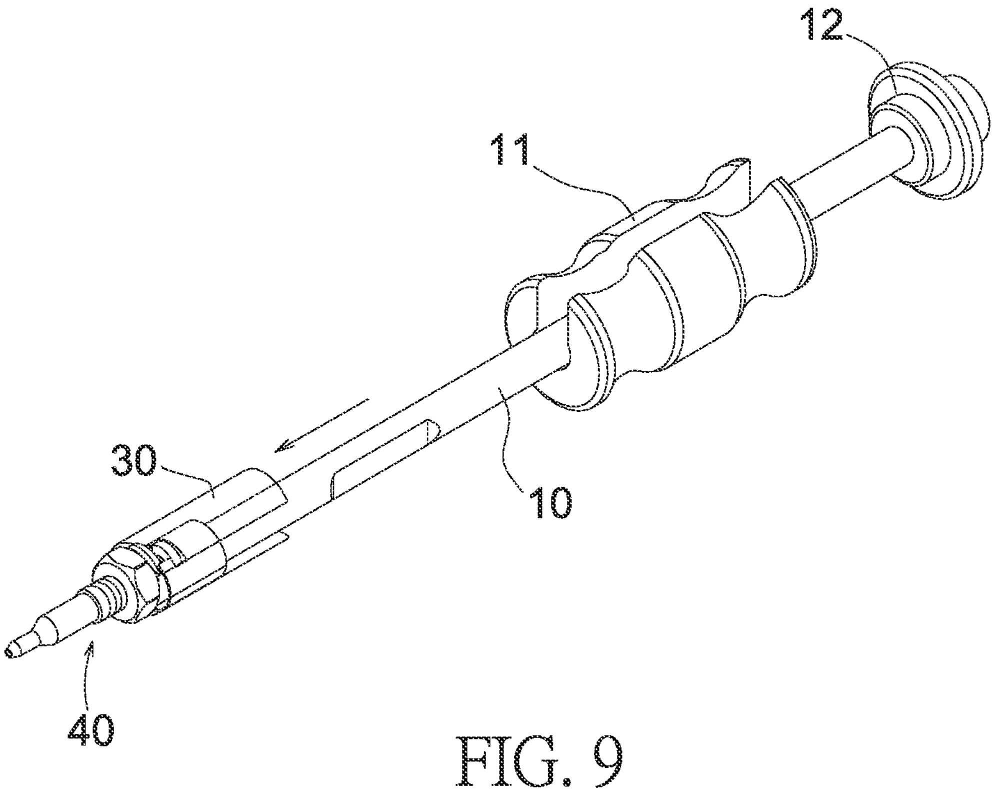
FIG. 9 is also another perspective view showing the operation of the slide hammer having the removable actuation element according to the second embodiment of the present invention.
Figure 10:
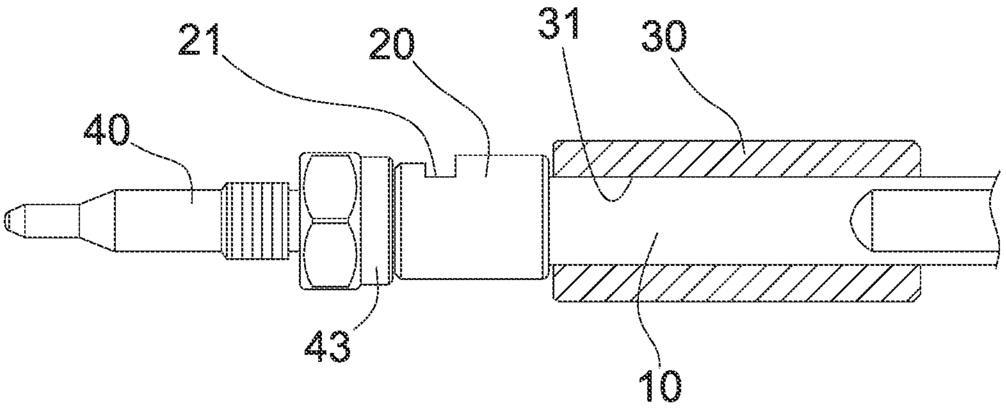
FIG. 10 is a cross sectional view showing the operation of the slide hammer having the removable actuation element according to the second embodiment of the present invention.
Figure 11:
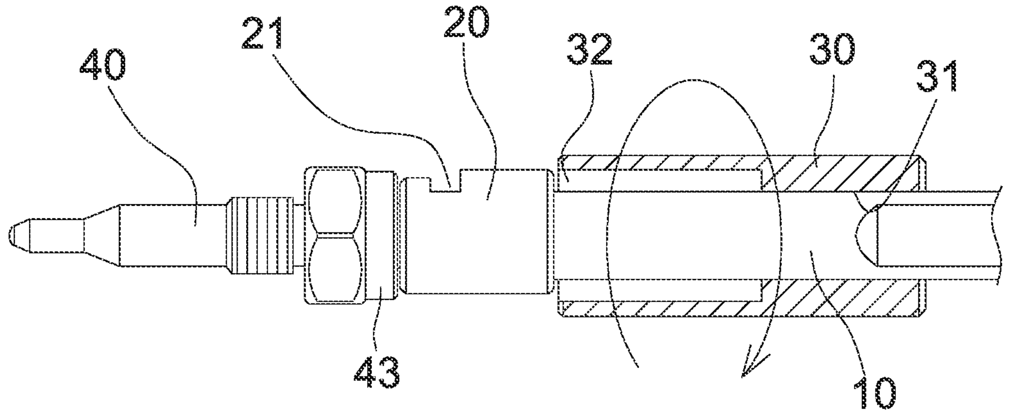
FIG. 11 is another cross sectional view showing the operation of the slide hammer having the removable actuation element according to the second embodiment of the present invention.
Figure 12:
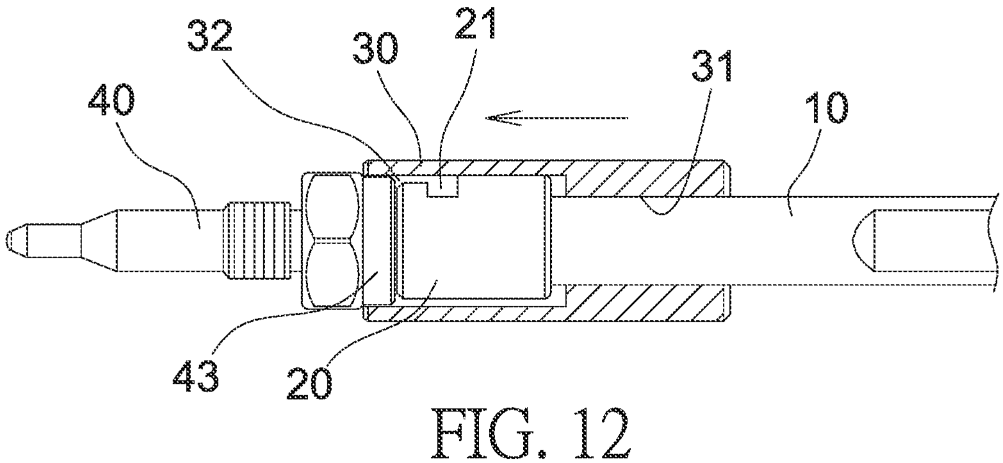
FIG. 12 is also another cross sectional view showing the operation of the slide hammer having the removable actuation element according to the second embodiment of the present invention.

Referring to FIGS. 3-5, in operation, the slidable sleeve 30 is slidably moved backward so that the fitting fringe 43 of the actuation element 40 and an outer wall of the connection element 20 expose, and the actuation element 40 is removably detachable to replace another actuation element of different sizes or types. Thereafter, a fitting fringe 43 of another actuation element 40 is fitted into the locking groove 21 of the connection element 20, and the slidable sleeve 30 is released so that the resilient element 103 moves back to an original position, and the coupling space 32 of the slidable sleeve 30 abuts against the fitting fringe 43 of the actuation element 40 and the outer wall of the connection element 20 to limit the engagement segment 41 of the actuation element 40 and the locking groove 21 of the connection element 20, thus connecting the actuation element 40 and the drive rod 10 quickly.

As shown in FIGS. 6-12, in a second embodiment, the slidable sleeve 30 includes a slot 31, and a diameter of the slot 31 is equal to a diameter of the drive rod 10, wherein the slot 31 is in communication with the coupling space 32 of the slidable sleeve 30 so that after the drive rod 10 is guided in the slot 31, the coupling space 32 is aligned with and is slid toward the connection element 20 to abut against the fitting fringe 43 of the actuation element 40 and the outer wall of the connection element 20, and the engagement segment 41 of the actuation element 40 and the locking groove 21 of the connection element 20 are limited, thus connecting the actuation element 40 and the drive rod 10 quickly.

Figure 13:
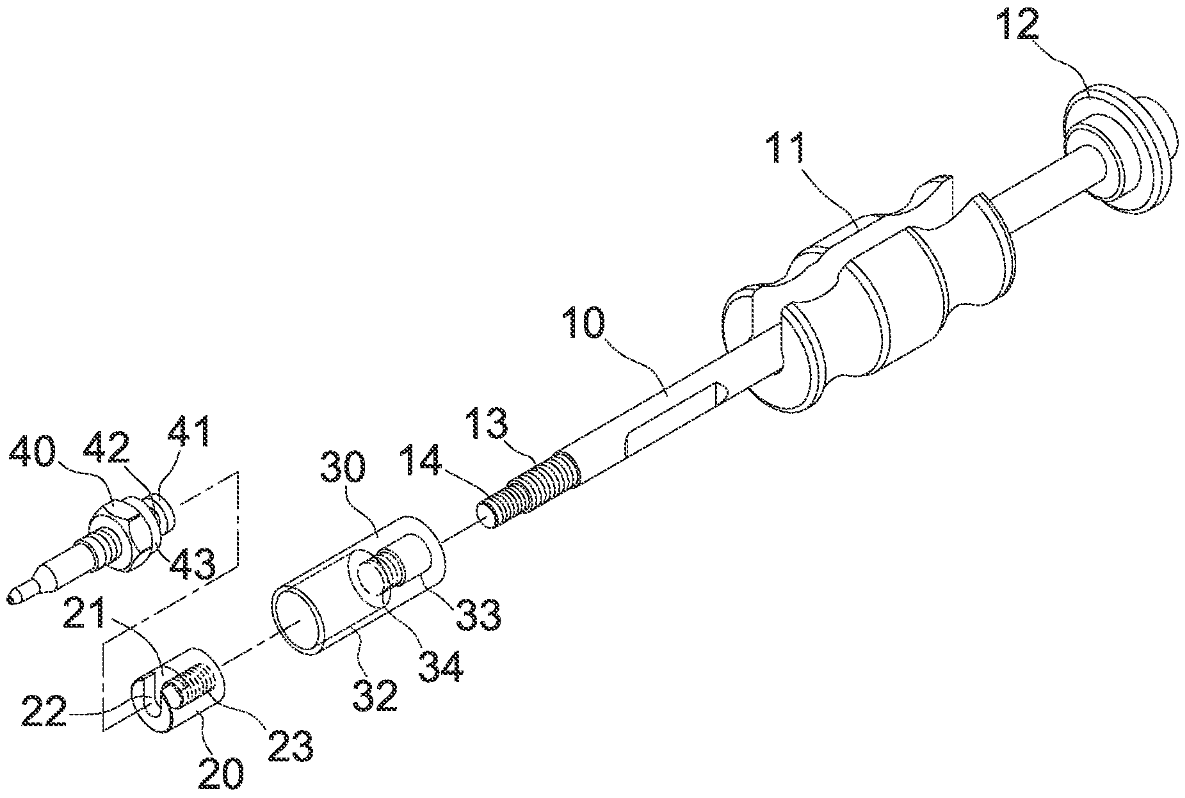
FIG. 13 is a perspective view showing the exploded components of a slide hammer having a removable actuation element according to a third embodiment of the present invention.
Figure 14:
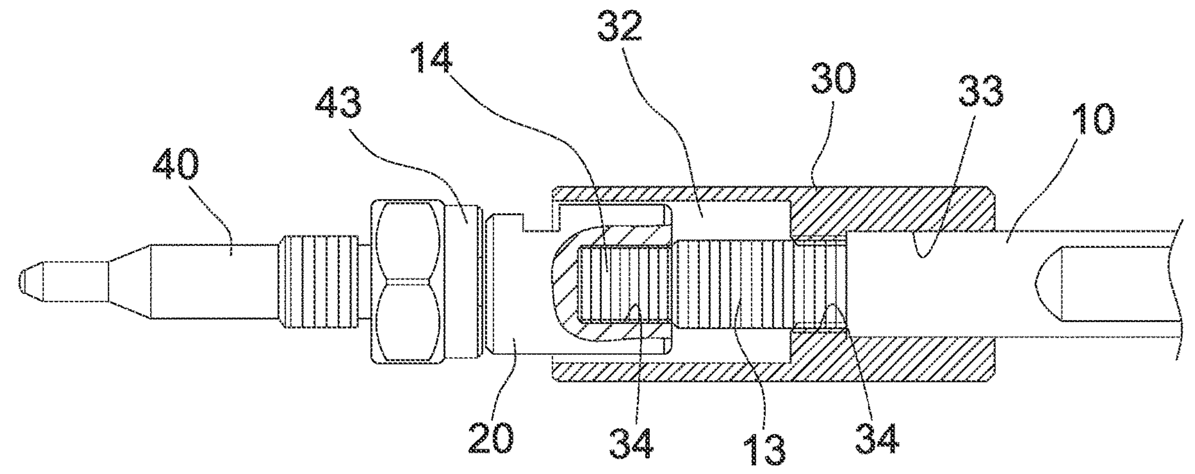
FIG. 14 is a cross sectional view showing the operation of the slide hammer having the removable actuation element according to the third embodiment of the present invention.
Figure 15:
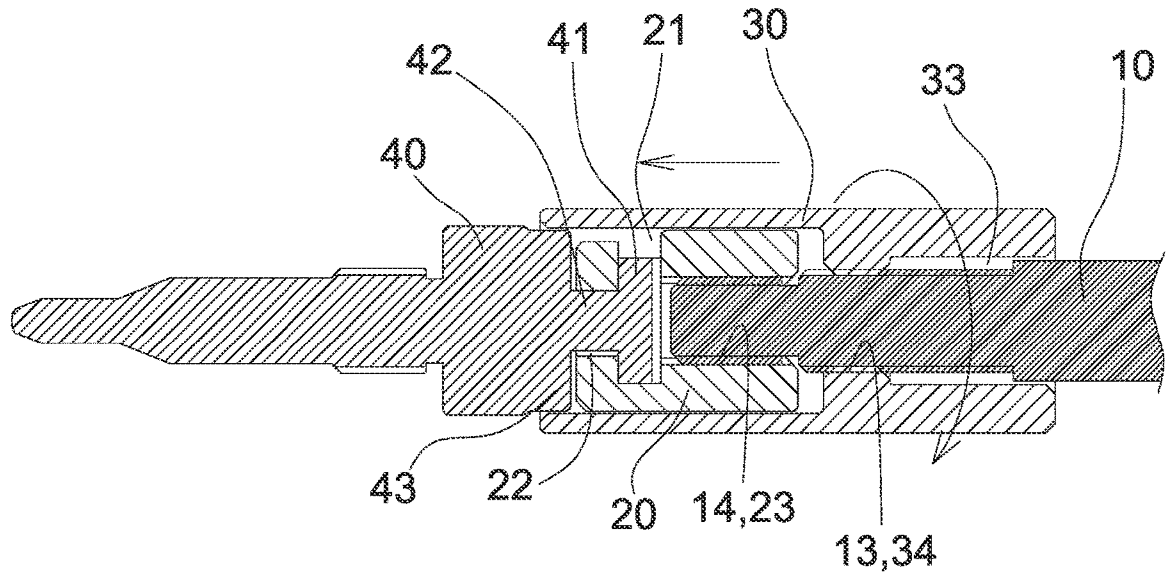
FIG. 15 is another cross sectional view showing the operation of the slide hammer having the removable actuation element according to the third embodiment of the present invention.

As illustrated in FIGS. 13-15, in a third embodiment, the drive rod 10 includes a first threaded section 14 and a second threaded section 13, wherein a diameter of the first threaded section 14 is less than a diameter of the second threaded section 13, and the coupling space 32 of the slidable sleeve 30 has a first screwing orifice 34 configured to screw with the second threaded section 13, wherein the slidable sleeve 30 further includes a guiding orifice 33 opposite to the first screwing orifice 34 and having a diameter equal to the diameter of the drive rod 10, and the connection element 20 includes a second screwing orifice 23 defined opposite to the locking groove 21 and screwing with the first threaded section 14 of the drive rod 10, such that after the first screwing orifice 34 of the slidable sleeve 30 is screwed with the second threaded section 13 of the drive rod 10, the first threaded section 14 is screwed with the second screwing orifice 23 of the connection element 20. Thereafter, the first screwing orifice 34 of the slidable sleeve 30 is movably screwed with the second threaded section 13 and is slid to the connection element 20 so that the coupling space 32 of the slidable sleeve 30 abuts against the fitting fringe 43 of the actuation element 40 and the outer wall of the connection element 20 to limit the engagement segment 41 of the actuation element 40 and the locking groove 21 of the connection element 20, thus connecting the actuation element 40 and the drive rod 10 quickly.

Accordingly, the actuation element 40 is movably engaged with the connection element 20 so that the coupling space 32 of the slidable sleeve 30 abuts against the fitting fringe 43 of the actuation element 40 and the outer wall of the connection element 20 to limit the engagement segment 41 of the actuation element 40 and the locking groove 21 of the connection element 20, thus connecting the actuation element 40 and the drive rod 10 quickly.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A slide hammer having a removable actuation element comprising:

a drive rod;

a connection element formed in a column shape and mounted on an end of the drive rod, the connection element including a locking groove defined on a first end of the connection element, a notch defined in the locking groove, wherein an arcuate diameter of the notch is smaller than the locking groove;

an actuation element including a fitting fringe formed on a first end of the actuation element and corresponding to the connection element, a cylindrical neck extending from the fitting fringe and having a diameter less than a diameter of the fitting fringe, and an engagement disc formed on the cylindrical neck and having a diameter more than the diameter of the cylindrical neck, wherein the diameter of the fitting fringe is equal to a diameter of the connection element; and a slidable sleeve including a coupling space formed in an arc shape and having a diameter larger than the diameter of the fitting fringe of the actuation element and the diameter of the connection element, wherein the slidable sleeve is slid so that the coupling space abuts against the fitting fringe of the actuation element and the connection element, and the engagement disc of the actuation element is engaged in the locking groove of the connection element;

wherein the drive rod includes a stepped shoulder formed on the end of the drive rod, a guide section extending from the stepped shoulder, a first threaded section extending from an end of the guide section away from the stepped shoulder, and a resilient element fitted on the guide section and stopped by the stepped shoulder; a first threaded orifice formed on a second end of the connection element and screwing with the first threaded section of the drive rod, the slidable sleeve further includes an accommodation space defined opposite to the coupling space and corresponding to the drive rod, and a defining shoulder formed between the accommodation space and the coupling space, wherein the accommodation space is configured to receive the resilient element, and the resilient element abuts against the defining shoulder.

2. The slide hammer having the removable actuation element as claimed in claim 1, wherein the slidable sleeve includes a slot, and a diameter of the slot is equal to a diameter of the drive rod, wherein the slot is in communication with the coupling space of the slidable sleeve.

3. The slide hammer having the removable actuation element as claimed in claim 1, wherein a drive rod including a grip portion and an acting segment which both extend on a first end of the drive rod, and the actuation element is connected with the grip portion and the acting segment of the drive rod to form a slidable hammer.

4. A slide hammer having a removable actuation element comprising:

a drive rod;

a connection element formed in a column shape and mounted on an end of the drive rod, the connection element including a locking groove defined on a first end of the connection element, a notch defined in the locking groove, wherein an arcuate diameter of the notch is smaller than the locking groove;

an actuation element including a fitting fringe formed on a first end of the actuation element and corresponding to the connection element, a cylindrical neck extending from the fitting fringe and having a diameter less than a diameter of the fitting fringe, and an engagement disc formed on the cylindrical neck and having a diameter more than the diameter of the cylindrical neck, wherein the diameter of the fitting fringe is equal to a diameter of the connection element; and a slidable sleeve including a coupling space formed in an arc shape and having a diameter larger than the diameter of the fitting fringe of the actuation element and the diameter of the connection element, wherein the slidable sleeve is slid so that the coupling space abuts against the fitting fringe of the actuation element and the connection element, and the engagement disc of the actuation element is engaged in the locking groove of the connection element;

wherein the drive rod includes a first threaded section and a second threaded section, wherein a diameter of the first threaded section is less than a diameter of the second threaded section, and the coupling space of the slidable sleeve has a first screwing orifice configured to screw with the second threaded section, wherein the slidable sleeve further includes a guiding orifice opposite to the first screwing orifice and having a diameter equal to the diameter of the drive rod, and the connection element includes a second screwing orifice defined opposite to the locking groove and screwing with the first threaded section of the drive rod.

* * * * *